United States Patent
Yang et al.

(10) Patent No.: US 8,315,132 B1
(45) Date of Patent: *Nov. 20, 2012

(54) DEFECT DETECTION DESIGN

(75) Inventors: Shaohua Yang, San Jose, CA (US); Hongwei Song, Longmont, CA (US); Zining Wu, Los Altos, CA (US); Xueshi Yang, Cupertino, CA (US); Hongxin Song, Sunnyvale, CA (US)

(73) Assignee: Marvell International Ltd., Hamiltom (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/235,658

(22) Filed: Sep. 19, 2011

Related U.S. Application Data

(63) Continuation of application No. 11/907,676, filed on Oct. 16, 2007, now Pat. No. 8,054,717.

(60) Provisional application No. 60/829,588, filed on Oct. 16, 2006.

(51) Int. Cl.
*G11B 15/52* (2006.01)

(52) U.S. Cl. ............... 369/47.14; 369/53.15
(58) Field of Classification Search ............... None
See application file for complete search history.

(56) References Cited

U.S. PATENT DOCUMENTS

| | | |
|---|---|---|
| 6,307,822 B1 | 10/2001 | Shim et al. |
| 2005/0078580 A1 | 4/2005 | Kochale et al. |
| 2005/0185540 A1 | 8/2005 | Tsai et al. |

*Primary Examiner* — Paul Huber

(57) ABSTRACT

A system and method are provided to detect defects in a data storage medium by sampling data read from the data storage medium. Time referenced samples of data read from the data storage medium are equalized to mediate the effects of channel noise and the equalized samples are decoded by a decoder, such as a Viterbi decoder. The decoded signal is then reconstructed through a reconstruction filter to approximate the equalized signal. The equalized data signal and the reconstructed data signal are then combined and compared in a bit-by-bit deconstruction scheme to determine, based on a variation between the signal elements, that a defect exists on the data storage medium. Additional action is then taken to mediate the effects of attempting to process corrupted data based on the defect by isolating the defective bit.

20 Claims, 7 Drawing Sheets

DEFECT DETECTION DESIGN

CROSS-REFERENCE TO RELATED APPLICATIONS

This application is a continuation of U.S. application Ser. No. 11/907,676, filed Oct. 16, 2007, which claims priority under 35 U.S.C. §119(e) to U.S. Provisional Application No. 60/829,588, filed Oct. 16, 2007. The disclosures of the applications referenced above are incorporated herein by reference.

BACKGROUND

This disclosure relates to systems and methods for detecting defects in data storage media that store data such as for archiving and subsequent retrieval purposes.

With a proliferation of removable non-volatile data storage media on which increasing amounts of data can be recorded and/or rerecorded, there has arisen an incumbent need to be able to detect defects in such media in order to, for example, avoid data corruption and adverse effects to downstream units, devices and adaptations based on trying to process corrupt data. Such defects may manifest themselves in a number of ways. Some of the more common manifestations of the types of defects that may be advantageous to detect include, but are not limited to, excessive amplitude variations such as amplitude drops, amplitude jumps, and/or shifts in the signal with a drop in dynamic range. These defects may be caused by, for example, a record/playback head flying too high or too low over a data track, being offset from the track, or by collisions with particles or asperities on the surface of the media. The defects may be temporary such that they disappear at the next read operation or after the next write operation or they may grow in severity or extent with successive operations.

In order to be able to retrieve data with a certain desired confidence level, it is important that the integrity of such data be established. The existence of a defect on a data storage medium represents a situation that often cannot be easily modeled or otherwise modeled at all. Hence, in view of the adverse impact that a defect may have on the integrity of the read or retrieved data and components or adaptations that may attempt to process the data, a reliable defect detector system may prove advantageous.

FIG. 1 schematically illustrates a simplified conventional data signal communication and processing system 1000. As shown in FIG. 1, the system 1000 may include an input signal source 1010 and a number of components for processing the input signal. These components may include, for example, an encoder 1020, and one or more transmission channel filters 1040. In this manner, an input signal received via the input signal source 1010 may be processed by one or more of the above-mentioned devices in order to provide a substantially distortion-immune and bandwidth-efficient signal to be recorded on a recording or transmission channel 1050. Such recording or transmission channel 1050 in different embodiments, it should be appreciated, may comprise virtually any form of, for example, wire-line media, wireless media, or data storage medium.

The encoder 1020 may encode the input signal to, for example, improve a Bit Error Ratio (BER) of the signal.

A transmission channel filter 1040 may shape the input signal waveform to attempt to make optimal use of the available channel bandwidth to support a highest data storage density based on an optimally filtered signal, with minimal signal distortion, from sources of distortion such as inter-symbol interference (ISI).

In general, the encoder 1020 and transmission channel filter 1040 are referred to as the transmitting side of the system for receiving an input signal from an input signal source 1010 and optimally presenting such a signal to a recording or transmission channel 1050. In other words, the overall objective of the transmitter side elements 1020 and 1040, as depicted in FIG. 1, is to allow the data to be stored in the recording or transmission channel 1050, received in raw form from the input signal source 1010, to achieve a desired level of immunity from various sources of distortion, degradation and noise, as well as to be converted into a form such that the data has a desired level of reliability after transmission through the recording or transmission channel 1050, to include being stored on a data storage medium.

As shown in FIG. 1, receiver side processing is undertaken by a series of receiver side elements consisting in this exemplary embodiment of elements 1070, 1080, 1090 and 1110. Processing through these elements essentially reverses the processing that the transmitter side elements performed to render the output signal as close a match to the input signal as pre-determined by a specified fidelity criterion. The receiver signal elements may include an automatic gain controller 1070, a receiver channel filter 1080, an equalizer 1090 and a decoder 1110, each element included with an objective of delivering to an output signal sink 1120, an output signal that precisely matches the input signal received from the input signal source 1010.

The automatic gain controller 1070 may modify the level of the received signal or recovered data such that the data signal is within an appropriate dynamic range to proceed through further processing.

The receiver channel filter 1080 may process the signal in much the same manner as the transmitter channel filtering performed by the transmitter channel filter 1040.

The equalizer 1090 may filter the dynamic range adjusted signal, which was previously filtered by the receiver channel filter 1080, in an attempt to mitigate the impact of phenomena, such as, for example, ISI. As the equalizer 1090 may be provided to further optimize the output signal to a specific capability of the output signal sink 1120, any one of the several available equalizer algorithms including, but not limited to, a linear feedforward equalizer, a linear feedback equalizer or a decision feedback equalizer may be used.

The decoder 1110 may optimally decode the signal to correspond to the specific capabilities of the output signal sink 1120. There are several available decoding schemes any of which may be employed by the decoder 1110. These include, but are not limited to, threshold decoding, Viterbi decoding and/or Turbo decoding.

The integrity of the information stored on a data storage media or transmitted via a recording/transmission channel is of paramount importance. The integrity of the data retrieved may be impacted in a number of ways. For example, retrieved data may be corrupted due to random noise, bursty noise, inter-symbol interference (ISI), non-linear distortions in the channel such as non-linear transition shifts (NLTS), read-write offsets and writing non-idealities. Many of these degradations may be corrected by applying one or more of the above methods commonly used in high-speed communications links, such as signal processing techniques, coding and channel estimation, and subsequent corrections. However, other factors may contribute to degradation and distortion in recovered data, particularly data stored on various types of data storage media. Principal among these factors effecting degradation and/or distortion in recovered data may be defects in the data storage media itself. Physical, and/or recording equipment induced, defects in any data storage medium that stores an input information signal as stored data have the potential to severely impact the integrity of the retrieved data and to render ineffective, or unusable, components and adaptations that attempt to process the data corrupted by one or more defects.

Such defects are not conventionally accounted for because conventional input data signal processing methods and capabilities, such as those discussed above, do not lend themselves to such defect detection and/or mitigation. Data storage media are often considered virtually defect-free. Based on the amount of data being compacted onto individual data storage media today, such an assumption may not recognize the possible hazards to the recovery and/or reproduction of data stored on such media. Complicating this problem even further is the fact that a given defect could be only temporary, and/or otherwise non-repeatable. In such an instance the defect could disappear on the next write cycle or the media could deteriorate from cycle to cycle. It is for this reason that modeling of certain defects, unlike many other of the factors that may degrade the integrity of the input signal data which can be corrected or mediated through a series of devices and related processes such as those described above, i.e., be they noise or other channel related failures, is extremely difficult. Possible contributing factors to the defects could be a record/playback head flying too high or too low over a data track, being offset from the track, or by colliding with particles or asperities on the surface of the media.

Impacts of these defects at the read channel retrieved signal manifest themselves in many forms or combinations of phenomena. These manifestations include but are not limited to the following. First, the amplitude of the recorded data signal sometimes drops to an extent of signal wipeout over a duration of several bits. Second, the amplitude may jump, possibly due to thermal aperities, and third, the signal may shift, often with an accompanying dynamic range drop. The random nature of the types of defects described, and the fact that many and often widely varied factors may contribute to the defects make these anomalies very difficult to model with an objective of such modeling being to subsequently isolate or compensate for the defects.

Previous efforts to address the problems of defect detection have included methods for generating special patterns, or defect scan patterns, to detect anomalies and isolate local defects (e.g. MADS) in the magnetic flux coupling of a recording media to a read head. The defect scan patterns affect normal operation of magnetic data storage devices. Other methods of defect detection, such as atomic force microscopy (AFM) and other microprobe techniques, are suited to laboratory use but not necessarily to production use due to their limited throughput.

These efforts encompass a range of solutions from partial detection to defect isolation. Techniques include harmonic analysis of the read head signal to detect head-to-media spacing or flying height (e.g. Harmonica Sensor (HSC)). Harmonic analysis methods may implicitly use thermal, fluid dynamic, and electromagnetic factors to optimize the average height of the read head. These methods may preclude effective means to isolated defects because the defect waveform is convolved with a long impulse response due to the harmonic analysis averaging window. In other words, harmonic-sensing methods impose narrow analysis bandwidths around the harmonics to be analyzed. Narrow analysis bandwidths impose slow response times that prevent pinpointing defects.

Additional conventional techniques include run time methods such as level detectors in an analog front end (AFE). Run time methods do not require special patterns or defect scans. Run time methods can pinpoint defects, such as amplitude jumps due to thermal asperities. However, level detection methods have not proven to be very sensitive to detecting level drops.

Shortfalls in prior efforts include: (1) incompatibility with run-time or real-time operations; (2) requirements for special patterns; (3) inability to localize or pinpoint defects; and/or (4) insensitivity to signal amplitude jumps, amplitude drops, and/or signal shifts accompanied by dynamic range shifts.

SUMMARY

It would be advantageous, therefore, to provide reliable systems and methods for defect detection through, for example, near real-time signal comparison and compensation, with an objective of, among others, at least informing a user that retrieved data, or an output data signal, may be corrupted, and therefore may be rendered unreliable, based on the detected defects.

In exemplary embodiments, the systems and methods according to this disclosure may provide a defect detector operating in a digital domain, e.g. on sampled or quantized signals. The defect detector may be implemented to detect defects during, and/or compatibly with, normal read/write operations. The defect detector may thus reduce or eliminate a need for any special data pattern in order to perform a defect scan.

In exemplary embodiments, the systems and methods according to this disclosure may provide for extraction of a reference signal from data retrieved from a signal read from a data storage medium. One or more specific characteristics of the signal read from the data storage medium may be represented by a comparison of the similarities between the one or more specific characteristics of the read signal with signal characteristics of the reference signal. Comparison between like characteristics of the reference signal and the read signal data may then yield a value of a deviation. If a quantitative value of the deviation is outside a certain threshold range, the data, and therefore possibly the medium, may be considered to have defects.

In exemplary embodiments, the reference signal may be derived from detected data, which is supposed to be a close copy of the actual data stored on the data storage medium. The characteristic of the signal retrieved from data storage medium may be a cross-correlation between the retrieved signal and the reference signal. The equivalent characteristics of the reference signal may be an auto-correlation function of the reference signal.

These and other objects, advantages and features of the disclosed exemplary systems and methods are described in, or apparent from, the following description of embodiments.

BRIEF DESCRIPTION OF THE DRAWINGS

Exemplary embodiments will be described, in detail, with reference to the following drawings, where like numerals represent like parts, and in which.

DETAILED DESCRIPTION OF EMBODIMENTS

Figure 1:
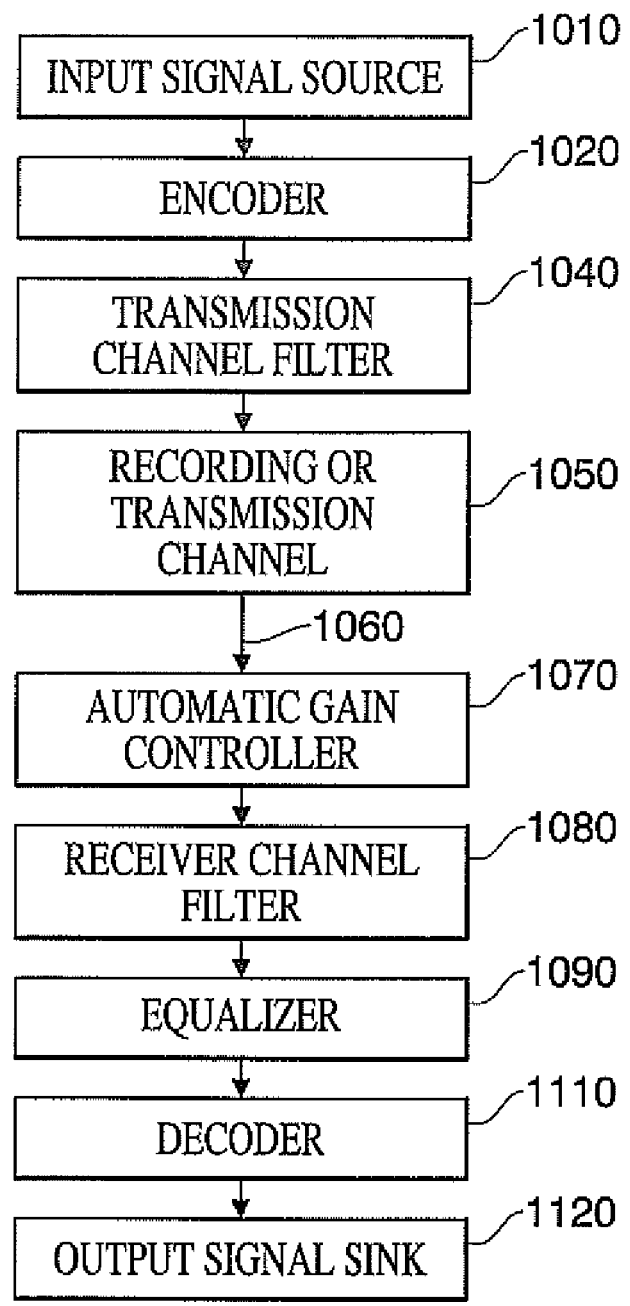
FIG. 1 schematically illustrates a simplified conventional data signal communication and processing system.

The following description of various exemplary embodiments of systems and methods for detecting defects in, for example, data storage media may refer to optical or other disk data storage media. The description may include reference to systems and methods for recording data thereon, and retrieving data therefrom, simply for clarity and ease of understanding. All references to such systems and data storage media are intended, however, to be illustrative of environments to which the systems and methods according to this disclosure may be adapted. The systems and methods according to this disclosure should not be construed, however, as being limited to such specific applications, or to any specific system that may be considered limited by elements shown in any of FIGS. 2-6. A defect detector according to the systems and methods of this disclosure may find applicability in other areas, other than with respect to detecting defects in data storage media. Such applicability may include any system in which an input signal is recorded and an ability to detect a deviation in that signal from the intended input signal, based on any one of a number of key factors relating to recording and reproduction of such a signal may prove beneficial. In other words, the descriptions of exemplary embodiments below may appear specifically aimed at detecting defects in an instance where a channel such as that shown in the conventional data signal communication and processing system of FIG. 1 is a data storage medium. The same scheme could, however, apply to other communication-related scenarios, applications or adaptations in which the detection of a defective link may prove advantageous.

The systems and methods according to this disclosure may provide a capability to detect a physical defect, or a recording defect, based on a comparison of information regarding at least one characteristic of data recovered from a data storage medium with a like characteristic of the input signal by which the data was recorded on the data storage medium. Such defect detection may alert a user to a situation where the retrieved data may have been corrupted by a defect. The retrieved data may, therefore, be considered unreliable or otherwise invalid. In exemplary embodiments, a defect flag may be set based on certain comparisons to alert a user to the presence of defects in the data storage medium resulting in invalidity of the recovered data.

The systems and methods according to this disclosure may provide a defect detector operating in a digital domain, e.g. on sampled or quantized signals. The defect detector may be implemented to detect defects during, and/or compatibly with, normal read/write operations. The defect detector may thus reduce or eliminate a need for any special data pattern in order to perform a defect scan.

Figure 7:
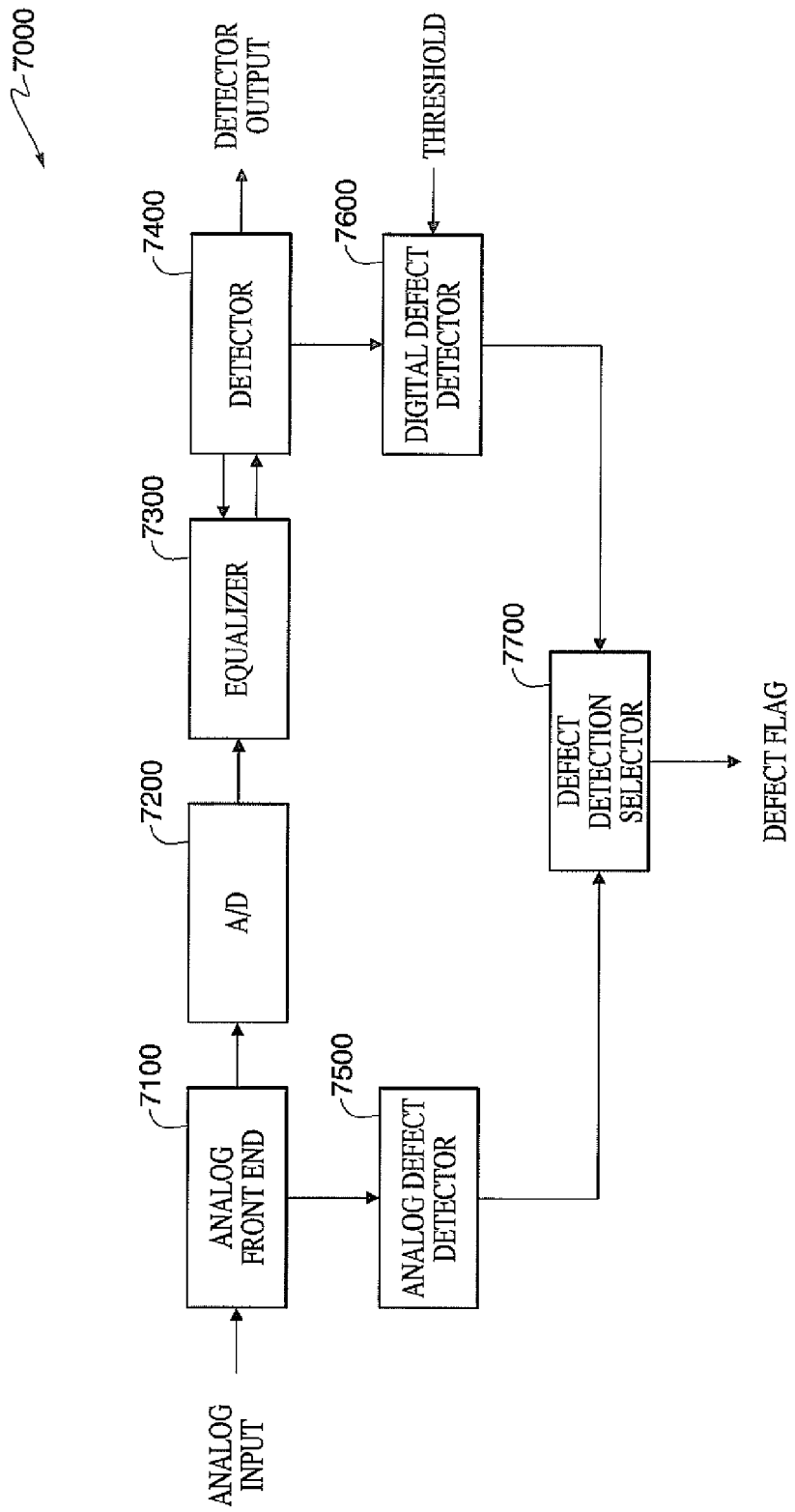
FIG. 7 illustrates an exemplary defect detection selector for generating and selecting analog and digital defect metrics.

FIG. 7 illustrates an exemplary defect detection selector 7000 for generating and selecting analog and digital defect metrics. The defect detection selector 7000 may include an analog front end (AFE) 7100, an analog-to-digital (A/D) converter 7200, an equalizer 7300, a detector 7400, an analog defect detector 7500, a digital defect detector 7600, and a defect detection selector 7700.

The AFE 7100 may accept an analog input signal from a read head, amplify the signal, filter the signal, and output the amplified, filtered signal to the A/D converter 7200 and the analog defect detector 7500. Signal filters in the AFE 7100 may include linear signal processing elements, such as one or more analog band shaping filters. These signal filters may otherwise include nonlinear signal shaping networks, such as an automatic gain control (AGC) amplifier, diode or transistor waveform shaping networks, or pulse-forming networks (PFN). Linear and nonlinear filter elements may be combined in an order-dependent fashion. For example, a low noise pre-amplifier or a nonlinear AGC may be followed by a linear high pass filter and a linear low pass filter.

In exemplary embodiments, the AFE 7100 may include a pre-amplifier, an AGC amplifier and/or a low pass filter, a matched filter, or a spectral shaping filter. A low pass filter may be an anti-aliasing filter that eliminates or attenuates unwanted signal and noise spectral components. A matched filter may approximately match a signal for an isolated flux transition read by the read head and may maximize the signal to noise ratio of the isolated flux transition. A spectral shaping filter may effect a compromise between anti-aliasing and matched filter performance.

The A/D converter 7200 may accept an output of the AFE 7100, digitize the signal, and output the digitized signal to equalizer 7300. The A/D converter 7200 may include a sample and hold (S/H) or a track and hold (T/H) amplifier to reduce adverse effects such as aperture jitter in the A/D converter 7200. The S/H or T/H amplifier may be integral to the AFE 7100.

The A/D converter 7200 may be of any type, such as, for example, a flash A/D converter, a successive approximation A/D converter, a hybrid A/D converter, a dual slope A/D converter, or the like. The A/D converter 7200 may include a self-test capability, and/or a compensator for missing codes, and may provide low differential nonlinearity and/or low integral nonlinearity. The A/D converter 7200 may be a nonlinear converter including a companding A/D converter that compresses a signal using unequal quantization intervals. These non-limiting examples are intended to be merely illustrative of various possible implementations of an A/D converter.

A clock signal may be provided to cause A/D converter 7200 to sample signals synchronously with a constant time interval between samples. The clock signal may otherwise cause A/D converter 7200 to sample asynchronously or at irregular intervals. Asynchronous sampling may be used to introduce dither signals, spread the spectrum of the received signal, or reduce the number of samples.

The equalizer 7300 may receive digitized samples from A/D converter 7200, equalize the samples, and output an equalized signal, based on the samples, to the detector 7400. Equalizer 7300 may receive feedback from detector 7300.

The equalizer 7200 may be a fixed FIR equalizer, a time varying FIR equalizer, a Kalman filter, an adaptive FIR or transversal equalizer, a decision directed equalizer, such as a decision feedback equalizer (DFE), or the like. The equalizer 7200 may include a series of delay elements, a corresponding series of weight elements, and one or more summing elements. The equalizer 7200 may be adjusted according to a mean square error (MSE) criterion or by decision feedback from detector 7400.

The detector 7400 may accept an equalized signal from equalizer 7300, perform a discrimination function, and output a digital defect detection input signal and a detected output signal. The digital defect detection input signal and the detected output signal may be the same signal. The digital defect detection input signal may be transmitted to digital defect detector 7600 as a single, scalar signal or as a vector of discrimination metrics. In other words, the digital defect detection input signal may include a set of test statistics or metrics rather than a single discriminant. For example, the digital defect detection input signal may include an L1 or absolute value norm, an L2 or square law norm, an $L_{infinity}$ or peak norm, or the like.

The digital defect detector 7600 may accept the digital defect detection input signal from the detector 7400, process the input, and output digital defect metrics to defect detection selector 7700. The digital defect detector 7600 may accept a threshold or a series of thresholds and may generate nonzero digital defect metrics when the digital defect detection input signal exceeds the threshold or thresholds. The threshold or set of thresholds may be the parameters of a discriminant function that classifies the digital defect detection input signal as normal, impaired, or defective.

The analog defect detector 7500 may accept a filtered signal from the AFE 7100 and may process the filtered signal using a combination of linear and nonlinear elements. The analog defect detector 7500 may include additional spectral shaping filters, amplifiers and nonlinear elements or thresholding elements, such as comparators, or the like.

The analog defect detector 7500 may transmit an analog defect metric or flag to defect detection selector 7700. The defect detection selector 7700 may choose to use the digital defect detection metric or the analog defect detection metric either autonomously or based on commands from other system components.

The defect detection selector 7700 may examine a time series of analog and/or digital defect metrics and may select among the detection metrics and output the selected detection metric as a defect flag. The defect detection selector 7700 may combine the analog and digital defect metrics to obtain a composite defect metric. The defect flag may be a metric that detects isolated defects, defect bursts, or time-correlated defects.

Figure 2:
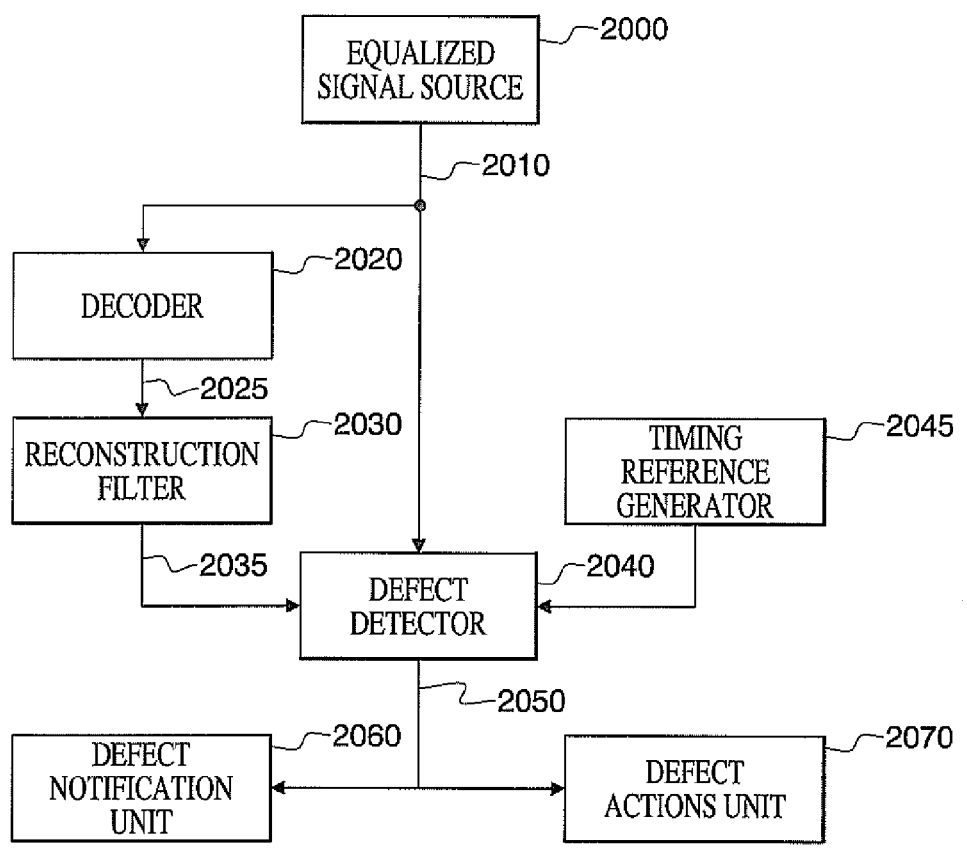
FIG. 2 schematically illustrates a high-level block diagram of an exemplary system for performing defect detection according to this disclosure.

FIG. 2 schematically illustrates a high level block diagram of an exemplary system for performing defect detection. As shown in FIG. 2, an equalized signal 2010 may be made available from an equalized signal source 2000. In this regard, with reference to, for example, FIG. 1, this equalized signal source may represent the communications elements depicted in FIG. 1 from element 1010 through element 1100.

In exemplary embodiments, the equalized signal 2010 received from the equalized signal source 2000 is split and input separately to decoder 2020 and defect detector 2040. In the detailed description of exemplary embodiments of the defect detector discussed below, this equalized signal 2010 will be referred to as Y(k) for consistency.

In an example wherein the decoder 2020 is, for example, a Viterbi decoder, such an equalized signal 2010, representing an actual signal sample and some noise, may be presented as an input to such decoder 2020. Algorithms within the decoder 2020 may attempt to map the equalized signal 2010 to some data pattern in an attempt to produce a most likely output signal 2025 that is matching the output at encoder 1020 shown in FIG. 1. As indicated above, such a decoder 2020 may employ one of a number of differing algorithms. Any reference in this disclosure to employment of the Viterbi algorithm to produce a most likely output signal 2025 is intended to be only illustrative of an exemplary decoding scheme and is not intended to be, in any way, limiting.

A reconstruction filter 2030 may be included separate from the decoder 2020. Alternatively, a reconstruction filter 2030 may be included as a part of the decoder 2020. In either instance, the reconstruction filter 2030 may be provided to reconstruct the decoded, or most likely, output signal 2025. In this manner, the decoded or most likely output signal 2025 may be provided as a reconstructed signal 2035 which is similar in characteristics to the equalized signal 2010.

As described further below, the defect detector 2040 may compare the equalized signal 2010 with the reconstructed signal 2035 to determine whether a difference between the equalized signal 2010 and the reconstructed signal 2035 lies within certain tolerances, i.e., threshold limits, or within a predetermined threshold range.

A timing reference generator 2045 may be included to provide a timing reference signal to any of the components including the defect detector 2040. The output signal 2025 and the reconstructed signal 2035 may then be time correlated and/or time sampled with reference to the timing reference signal generated by the timing reference generator 2045.

The defect detector 2040 may determine that a comparison between the equalized signal 2010 and the reconstructed signal 2035 lies outside of certain threshold limits or outside a predetermined threshold range. In such an instance, a defect indicator signal 2050 representative of a detected defect will be output from the defect detector 2040.

It should be appreciated that the comparison between the equalized signal 2010 and the reconstructed signal 2035 may be undertaken on a bit-by-bit basis. Alternatively, the comparison may be undertaken on a bit stream of a predetermined length. To any extent that the signals should be time correlated or time sampled, such time correlating and/or time sampling may be accomplished based on a timing reference signal generated by the timing reference generator 2045. This may include such sampling as may be appropriate to coordinate time window sampling, or bit-by-bit sampling, and comparing of the signals.

Based on the defect indicator signal 2050 from the defect detector 2040, a defect notification unit 2060 may provide a notification to a user of detection of a defect. Communication means for providing such a notification may include a display device such as a user interface or a graphical user interface associated with the defect notification unit 2060.

A defect actions unit 2070 may mark and/or erase detected defective bits of information. Alternatively, the defect actions unit 2070 may freeze timing regarding an adaptation running based on the equalized signal 2010. The defect actions unit 2070 may otherwise take such actions as may be appropriate to reduce or eliminate detrimental effects of defective bit data reaching active and/or running applications and/or adaptations. These applications and/or adaptations rely on valid, non-corrupt data from the equalized signal source 2000.

It should be recognized that the reconstructed signal 2035 (referred to as Z(k) for consistency in the discussion below) in the absence of defect, should match, or compare favorably with, the equalized signal 2010. In other words, the output of the decoder 2020 is intended to represent a true copy of the data that is stored on the data storage medium from which the equalized signal source 2000 obtains the equalized signal 2010. Mismatches in the characteristics between the signal representative of the data read from the data storage medium represented in FIG. 2 as the equalized signal 2010 and the decoded and then reconstructed signal 2035 output from the reconstruction filter 2030 should be within a pre-determined threshold range. This conclusion is, of course, based on an assumption that the data storage media is substantially defect free and a BER and other indications of noise and interference are acceptably low.

As will be discussed in more detail below, exemplary embodiments of the systems and methods according to this disclosure may employ time sequenced samples, the equalized signal (Y(k)) 2010 representing the stored signal samples, and the detected data bits d(k) representing, within the bounds of errors contributed by the media, the retrieved copy of the actual data. The notations Y(k) and d(k) are used in the discussions below to provide simplified representations of discrete time samples Y(kT) and d(kT), respectively, where k is a clocking or timing index. A sampling interval T may be provided by a timing reference signal at a rate of fc (=1/T) Hz (samples/sec). Detected data bits d(k) are generally those that are output from the decoder 2020. The defect detector 2040 compares the equalized signal (Y(k)) 2010 and the reconstructed signal (Z(k)) 2035 to determine if a difference in like characteristics derived from Y(k) and Z(k), respectively, over a period of observation, lies within a threshold range. The period of observation may be referred to as an interval of time during which the characteristics derived from Y(k) and Z(k) are estimated.

Figures of merit generated for comparison may be determined in a matched filtering process for each of the equalized signal (Y(k)) 2010 and the reconstructed signal (Z(k)) 2035. The figures of merit will be referred to, respectively, below as L(k) and M(k).

Figure 3:
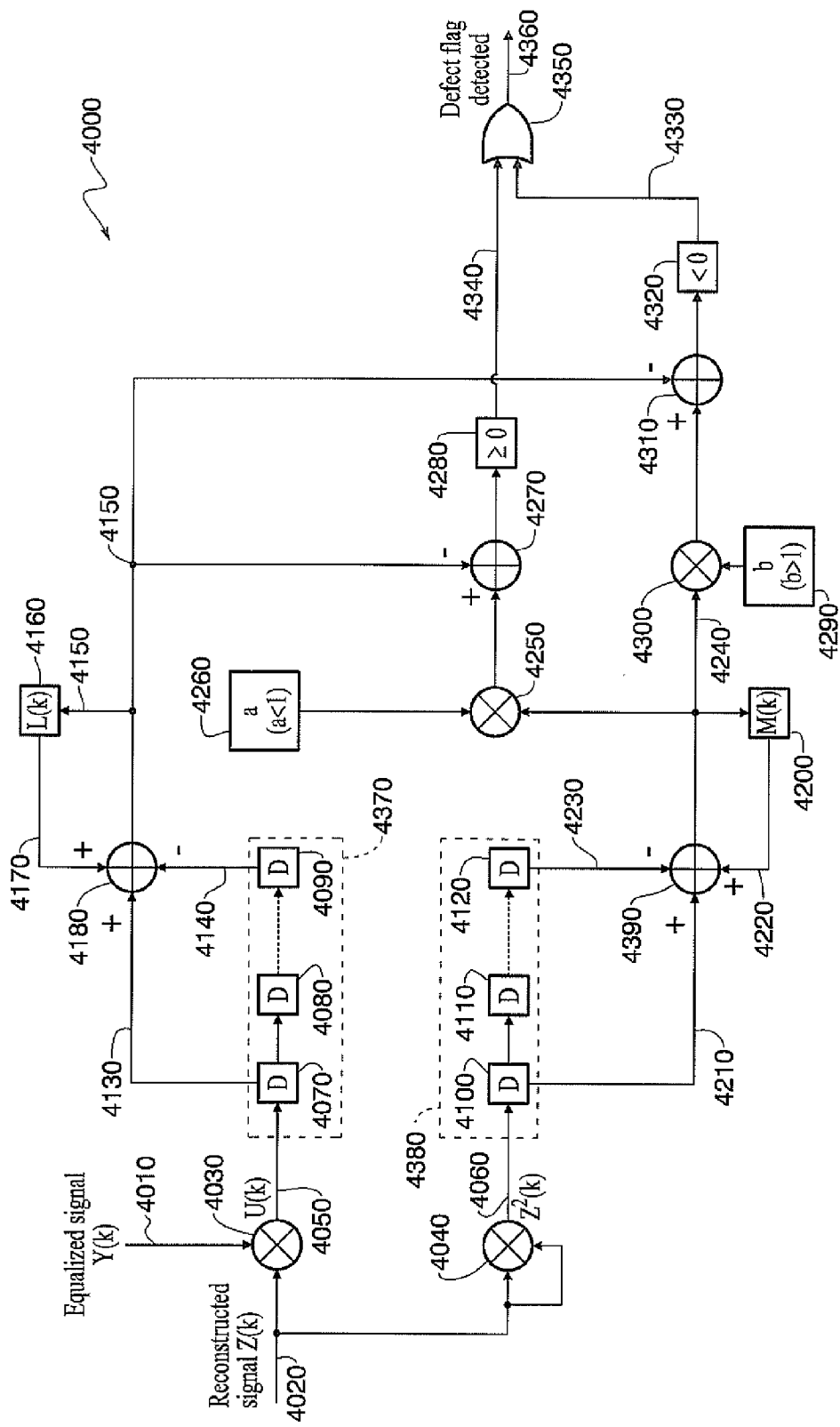
FIG. 3 illustrates a signal processing architecture for a first exemplary embodiment of a defect detector according to this disclosure.

FIG. 3 schematically illustrates a first exemplary embodiment of a defect detector 4000. As shown in FIG. 3, an equalized signal Y(k) 4010 may be introduced to a multiplier 4030. A reconstructed signal Z(k) 4020, such as that output from a decoder and reconstruction filter as shown in FIG. 2, may also be introduced to the multiplier 4030. The signals are multiplied together to produce an output signal U(k) 4050.

At the same time, the reconstructed signal Z(k) 4020 may also be introduced to a separate multiplier 4040, where the signal may be multiplied with itself to produce an output squared signal $Z^2(k)$ 4060.

In each case then, the output value U(k) 4050 and the output squared value $Z^2(k)$ 4060 may be introduced to separate moving average filters 4370, 4380, respectively. It should be appreciated that a combined processing of multiplication followed by moving average filtering may be representative of a correlation or matched filtering operation. Each of the moving average filters 4370, 4380 comprises delay blocks 4070-4090 and 4100-4120, respectively. Each of the moving average filters 4370, 4380 may be implemented in a recursive manner such that the components of L(k) and M(k) are delayed through delay blocks 4160 and 4200 respectively and fed back to adders 4180 and 4390 to generate L(k) and M(k).

It should be appreciated that the longer the moving average filter, e.g., the higher the number of delay blocks, the more precisely a defect may be detected. One trade-off involved in gaining such precision is an increased complexity in hardware implementation or processing. Such precision must be balanced by an understanding that determination of a defect, and setting of a defect flag 4360, may not occur until the total sampling within the moving average filter 4370, 4380 is completed. For example, in a case where the moving average filter 4370, 4380 concludes bit discrimination across 30 bits, a defect within that 30-bit sequence may be averaged out and may not even raise the defect flag 4360. It should be understood, however, that short term duration (involving small numbers of sets in a sequence) defects are considered less harmful than defects involving large numbers of sets and occurring randomly over time.

Added signals 4170 and 4220 represent the figures of merit L(k) 4150 and M(k) 4240 that are to be compared. The computations of the figures of merit L(k) 4150 and M(k) 4240 are represented by the following equations:

$$L(k) = \sum_{k-P+1}^{k} Y(k)Z(k) = \sum_{k-P+1}^{k} U(k) \qquad \text{Equation 1}$$

$$M(k) = \sum_{k-P+1}^{k} Z^2(k) \qquad \text{Equation 2}$$

These equations simplify the above discussion as follows. The multiplication through the multiplier 4030 of the corresponding signals Y(k) and Z(k) is accomplished, with identical time indices k, resulting in output signal U(k) 4050. The signal samples of U(k) through moving average filter 4370 over a sliding window such that at any time index k, may be accumulated. Figure of merit L(k) 4150 represents a sum of a set of P different bit signals samples of output signal U(k) 4050. This service includes the signal sample of U(k) corresponding to the present time index k and those corresponding to the (k−1 through k−P−1) immediately previous time contiguous indices (where P is the number of bit samples processed through the moving average filter). Simultaneously, signal Z(k) 4020 is squared through multiplier 4040. The signal samples $Z^2(k)$ through moving average filter 4380 over the same sliding window such that at any time index k may be accumulated. This accumulation results in a figure of merit M(k) 4240 that represents a set of P different bit signal samples of $Z^2(k)$, including the signal sample of $Z^2(k)$ corresponding to the present index k and those corresponding to the (k−1 through k−P−1) immediately previous time contiguous indices.

Scaling factors "a" 4260 and "b" 4290 are then applied through multipliers 4250 and 4300, respectively, to the figure of merit M(k) 4240. A threshold range is thereby established with a first scaling factor "a" 4260 being chosen to be less than 1 and a second scaling "b" 4290 being chosen to be greater than 1. The lower value of the threshold range is set at a*M(k) by multiplier 4250. The higher value of the threshold range is set at b*M(k) by multipliers 4300.

A declaration of a detected defect is based on a judgment as to how close the figure of merit L(k) is to the threshold-adjusted M(k). The index of closeness is defined as the threshold range. If L(k) falls within the threshold range, satisfying the relationship $$a^*M(k) < L(k) < b^*M(k) \qquad \text{Equation 3}$$

the system 4000 concludes that there is no defect. On the other hand, if L(k) falls outside the threshold range and hence satisfies either one of the two relationships:

$$(i) L(k) \leq a^*M(k); \text{ or} \qquad \text{Equation 4}$$

$$(ii) L(k) > b^*M(k) \qquad \text{Equation 5}$$

the system 4000 concludes that there is a defect present on the data storage media.

Systematically, the above relationship may be determined by subtracting from the adjusted signal sample M(k) output from each of multipliers 4250 and 4300 the signal sample L(k) 4150 in each of the subtractors 4270 and 4310, as shown. The results are then compared to zero (0) as shown in blocks 4280 and 4320. If either of the comparisons depicted in blocks 4280 or 4320 is satisfied, then a defect detected signal 4340 or 4330, respectively, is sent to an OR gate 4350. Consequently, a deflect flag 4360 may be set.

It should be recognized that the scaling factors "a" 4260 and "b" 4290 may be set by a user, may be predetermined or may be otherwise provided to the system 4000 in any appropriate manner based on a desired confidence level in the integrity of the output data.

Figure 4:
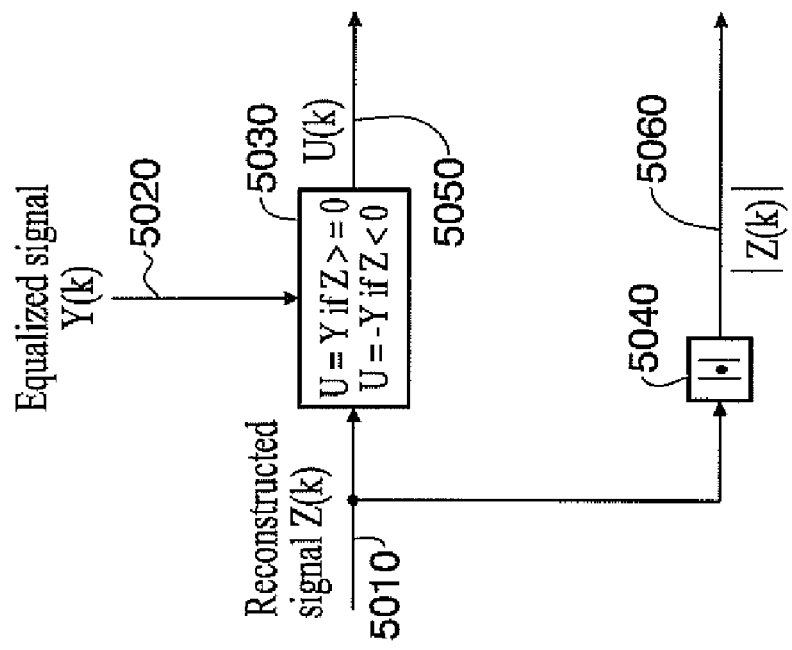
FIG. 4 illustrates a signal processing architecture for a second exemplary embodiment of a defect detector according to this disclosure.

FIG. 4 shows a partial variation on FIG. 3 as a second embodiment of a defect detector according to this disclosure. As shown in FIG. 4, a signed cross-correlation between the equalized signal Y(k) 5020 and the reconstructed signal Z(k) 5010 is performed in function block 5030, while an absolute value signal 5060 for Z(k) is output from function block 5040.

The rest of the processing given these values of U(k) 5050 and |Z(k)| 5060 as inputs to proceeds as in FIG. 3. The respective figures of merit for comparison may be determined according to the following relationships:

$$L(k) = \sum_{k-P+1}^{k} Y(k)\text{sgn}(Z(k)) = \sum_{k-P+1}^{k} U(k) \qquad \text{Equation 6}$$

where the function sgn(x) is 1 if x≧0 and sgn(x) is −1 if x<0.

$$M(k) = \sum_{k-P+1}^{k} mag(Z(k)) \qquad \text{Equation 7}$$

where the function mag(x) is x if x≧0 and mag(x) is −x if x<0.

It should be appreciated that the processing necessary to do reconstruction filtering, matched filtering and comparisons, as discussed above, may be implemented on a variety of different devices and systems. Some examples of the implementation platforms may be a programmed general purpose computer, a special purpose computer, a programmed microprocessor or microcontroller and peripheral analog and/or digital integrated circuit elements, and ASIC or other integrated circuit, a hard wired electronic or logic circuit such as a discrete element circuit, a programmable logic device such as a PLD, PLA, FGPA or PAL or the like. The implementation may also be composed of a combination of such systems wherein the different functions of the defect detecting system may be implemented by different platforms.

Figure 5:
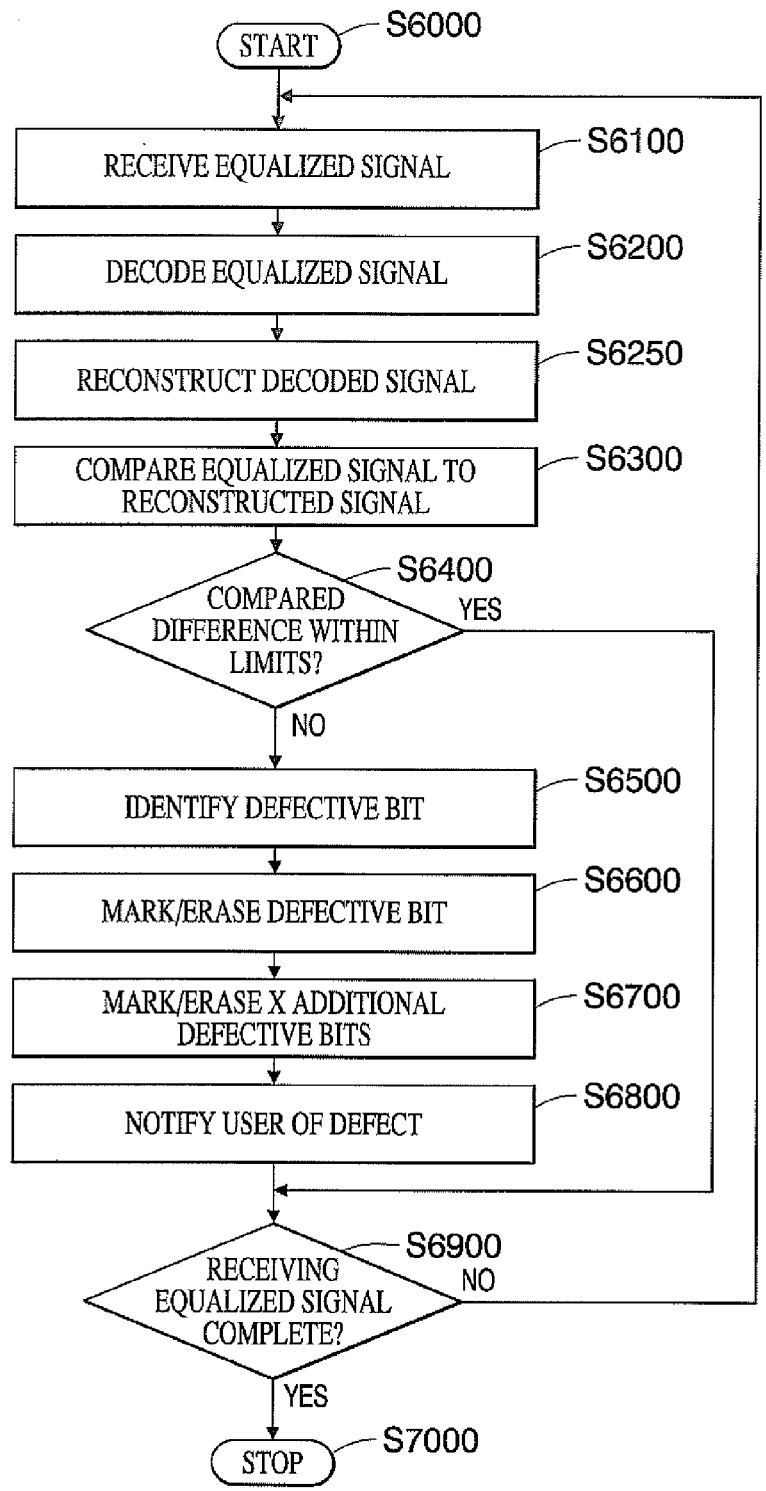
FIG. 5 illustrates a flowchart of a first exemplary embodiment of a method for detecting defects according to this disclosure.

FIG. 5 illustrates a first exemplary embodiment of a method for detecting defects based on a detected defect signal (flag). As shown in FIG. 5, operation of the method commences at step S6000 and proceeds to step S6100.

In step S6100, an equalized signal may be obtained. Such equalized signal may be obtained from any source. Pre-processing may have been performed on the signal in order to attempt to reduce, for example, noise and other interference associated with the signal. Sources may provide a signal that represents data being read from a data storage medium. Operation of the method continues to step S6200.

In step S6200, the equalized signal may be decoded by a decoding means, device or unit. An example of such a decoding device or unit may be a decoder that executes, for example, a Viterbi algorithm, or other like decoding device and/or unit. Operation of the method continues to step S6250.

In step S6250, the decoded signal may be reconstructed to approximate the equalized signal by, for example, being processed through one or more reconstruction filters. It should be appreciated that the reconstruction of the decoded signal may be undertaken by one or more reconstruction filters that are separate from, for example, the decoder, or the reconstruction filtering may be accomplished in sequence with the decoding in a single decoder unit, device or step. Operation of the method continues to step S6300.

In step S6300, a comparison is undertaken between the equalized signal and the reconstructed signal. This step generates figures of merit from the equalized signal and reconstructed signal, which will be used in step S6400. It should be appreciated that this comparison may include reference to each of the input signals correlated with reference to some generated timing reference signal. A time sampled comparison may be undertaken on time corresponding elements of the input signals. It should be appreciated that an equalized signal may be cross-correlated with a reconstructed signal and compared to an auto-correlation of the reconstructed signal as discussed above. Operation of the method continues to step S6400.

Step S6400 is a determination step in which a determination may be made whether a compared difference between the figures of merit obtained from the equalized signal and the reconstructed signal lies within certain limits, e.g., a threshold range. It should be appreciated that these limits and/or range may be one or more of pre-determined, pre-stored or input by a user in response to a real-time query via, for example a user interface. The limits are intended to set a threshold range, for example, for an amplitude deviation of one signal as compared to another signal. Differences between, for example, the cross correlation between an equalized signal and an amplitude of a reconstructed signal and the auto-correlation of the amplitude of the reconstructed signal are assessed as to whether they lie within those limits or that range.

If in step S6400, a determination is made that a difference between the equalized signal and the reconstructed signal lies within specified limits, operation of the method continues to step S6900.

If in step S6400, a determination is made that a difference between the equalized signal and the reconstructed signal does not lie within specified limits, operation of the method continues to step S6500.

In step S6500, a detected defect, such as, for example, a defective bit in a bit stream, may be identified. Operation of the method continues directly to step S6900, or to one or more of steps S6600, S6700 or S6800.

In step S6600, a defect such as a defective bit may be at least one of marked or erased. In this manner, a receiving output data sink, other data receiving and implementing device or unit, or downstream adaptation may ignore such a marked and/or erased defective bit that may represent corrupt output data. Operation of the method continues directly to step S6900, or to one or more of optional steps S6700 and S6800.

It should be appreciated that the term output data sink, as noted above, may include, for example, subsequent decoders or other like data manipulation devices or units, and/or they may include other adaptations that may be adversely affected by receiving and/or acting corrupted data. It is an objective of defect detection according to this disclosure, among others, to attempt to reduce, or otherwise eliminate, such adverse effects on downstream devices and/or adaptations based on identifying defects in, for example, a data storage medium, by identifying defective bits in a bit stream.

In optional step S6700, based on, for example, a moving average filter being "x" bits in length, a detected defect may have been present in any one or more of those "x" bits prior to the defect detector providing an indication of a defect. As such, it may be advantageous to mark and/or erase the previous "x" bits once a defect is detected. Operation of the method continues directly to step S6900, or optionally to step S6800.

In optional step S6800, a user may be notified by some defect notification means, device or unit that a defect has been detected. Such notification may also include information that some operation has been undertaken with respect to the defective bit and/or bits such as, for example, marking and/or erasing those bits in order to attempt to mitigate harmful effects of defective bits being read by subsequent devices and/or adaptations. Operation of the method continues to step S6900.

Step S6900 is a determination step in which a determination is made regarding whether the obtaining and/or receiving of the equalized signal is complete.

If in step S6900, a determination is made that the receiving of the equalized signal is not complete, operation of the method reverts to step S6100.

If in step S6900, a determination is made that the receiving of the equalized signal is complete, operation of the method proceeds to step S7000 where operation of the method ceases.

Figure 6:
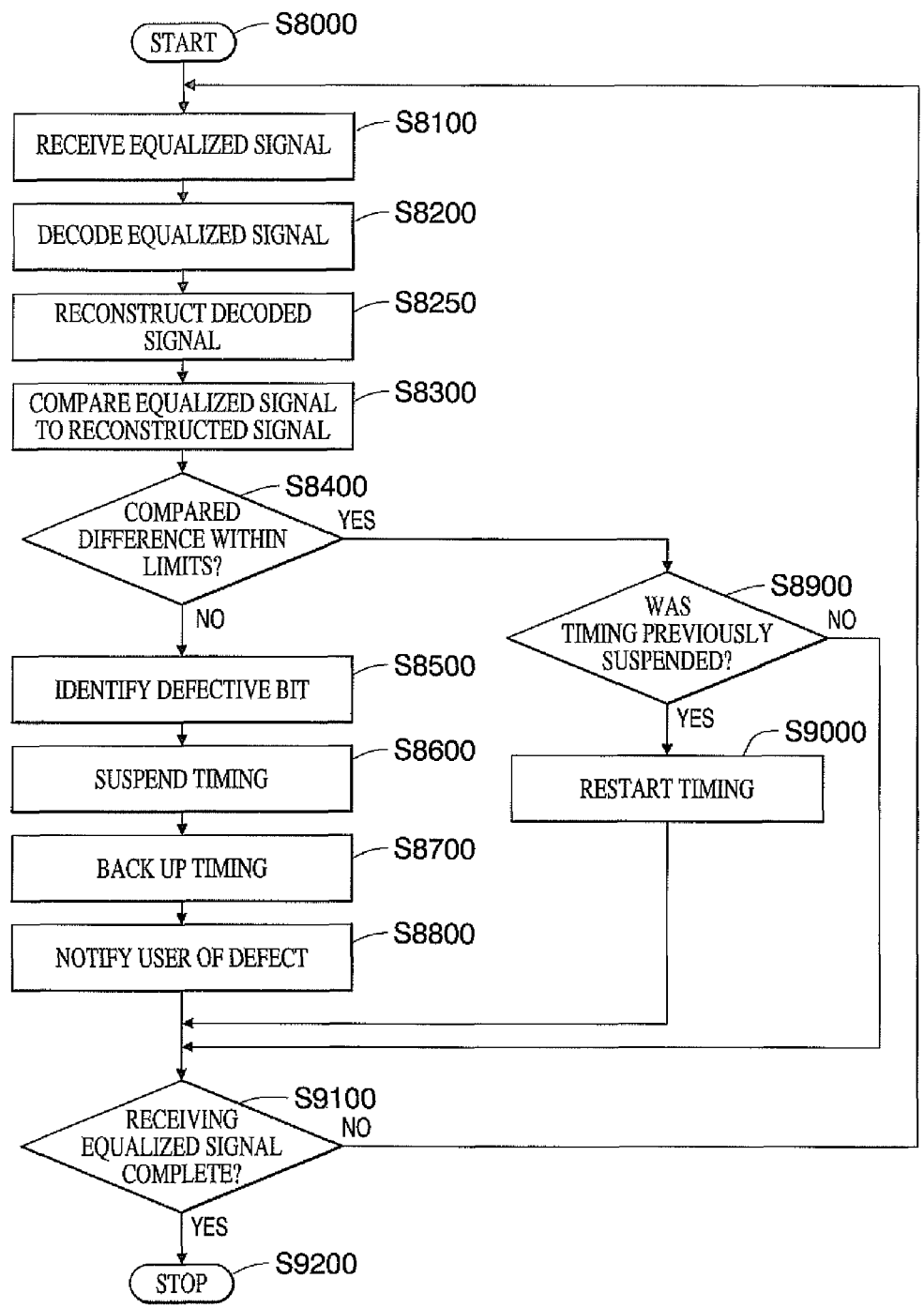
FIG. 6 illustrates a second exemplary embodiment of a method for detecting defects according to this disclosure.

FIG. 6 illustrates a flowchart of a second exemplary embodiment of a method for detecting defects and executing second exemplary further processing based on a detected defect signal (flag). As shown in FIG. 6, operation of the method commences at step S8000 and proceeds to step S8100.

Steps S8100-S8400 correspond to steps S6100-S6400 as described in paragraphs [0056]-[0061] above.

If in step S8400, a determination is made that the difference between the equalized signal and the reconstructed signal does not lie within specified limits, operation of the method continues to step S8500.

In step S8500, a defective bit is identified in the same manner as in step S6500 in FIG. 5, and as described above. Operation of the method continues directly to step S9100, or to one or more of steps S8600, S8700 or S8800.

In step S8600, based on the detected defective bit, a timing sequence regarding reading and/or signal transmission may be suspended. Reliance by downstream adaptations on data that may be corrupted is thus suspended. Reference may be made to a timing reference signal generated, for example by a timing reference generator unit, or otherwise, for timing suspension. Operation of the method continues directly to step S9100, or to one or more of steps S8700 or S8800.

In step S8700, with timing suspended, timing may be further backed up by a number. This number of bits may include a total number of delay elements in a moving average filter such as that described with respect to FIG. 3 above. Operation of the method continues directly to step S9100 or to step S8800.

It should be appreciated that suspension, and/or backup, of timing may be provided in order to attempt mitigate and/or otherwise eliminate harmful effects of detected defective bit data on downstream devices and/or adaptations.

In step S8800, notification of a user may be undertaken in like manner to that described above with respect to step S6800 in FIG. 5. Operation of the method continues to step S9100.

If in step S8400, a determination is made that, based on the comparison between the equalized signal and the reconstructed signal, the difference lies within specified limits, operation of the method continues directly to step S9100 or to step S8900.

Step S8900 is a determination step in which a determination is made whether timing may have been previously suspended based on a previous detection of a defect in, for example, a previous cycle of the method.

If in step S8900, a determination is made that timing was not previously suspended, operation of the method continues to step S9100.

If in step S8900, a determination is made that timing was previously suspended, operation of the method continues to step S9000.

In step S9000, previously suspended timing may be restarted in order that downstream devices and/or units or otherwise adaptations may proceed in accordance with the prescribed timing once an area of detected defective output data has been traversed. Reference to a timing reference signal may be made as appropriate. Operation of the method continues to step S9100.

Step S9100 is a determination step like that described above regarding step S6900 in FIG. 5 in which operation of the method is either directed back to an initial state at, for example, step S8100, or operation of the method proceeds to step S9200, where operation of the method ceases.

While this proposal has been described with specific embodiments thereof, it is evident that many alternatives, modifications and variations will be apparent to those skilled in the art. Accordingly, the preferred embodiments of this invention as disclosed are intended to be illustrative, not limiting.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims. Various changes may be made without departing from the spirit and scope of the inventive concept as described above and defined in the following claims.

What is claimed is:

1. A system for detecting defects in data, comprising:
   a decoder configured to decode a data signal to produce a decoded signal;
   a reconstruction filter configured to reconstruct the decoded signal as a reconstructed data signal;
   a defect detector configured to receive the data signal and the reconstructed data signal correlated with respect to a timing reference and compare time-referenced information associated with the data signal and the reconstructed data signal to detect a defect; and
   a defect indicator configured to provide an indication of the detected defect.

2. The system of claim 1, further comprising:
   a first signal combining device configured to combine characteristics of the data signal and the reconstructed data signal to provide a first information signal; and
   a second signal combining device configured to manipulate characteristics of the reconstructed data signal to provide a second information signal,
   wherein the defect detector compares the first information signal and the second information signal to detect the defect.

3. The system of claim 2, wherein:
   the first signal combining device multiplies an amplitude of the data signal with an amplitude of the reconstructed signal according to the timing reference to produce the first information signal, and
   the second signal combining device multiplies an amplitude of the reconstructed signal with itself to produce a square of the amplitude of the reconstructed signal according to the timing reference to produce the second information signal.

4. The system of claim 2, further comprising:
a first figure of merit estimator configured to process the first information signal to obtain a first figure of merit based on the first information signal; and
a second figure of merit estimator configured to process the second information signal to obtain a second figure of merit based on the second information signal,
wherein the defect detector compares the first figure of merit and the second figure of merit to detect the defect.

5. The system of claim 4, wherein the first and second figures of merit are generated by filtering the first and second information signals, respectively.

6. The system of claim 5, further comprising moving average filters that filter the first and second information signals, each moving average filter being P bits in length, where P is a positive integer value, and the filtering occurs over a number of time samples P.

7. The system of claim 4, further comprising a threshold determining unit configured to determine at least one threshold for use in the comparison, wherein the at least one threshold is applied to at least one of the first figure of merit and the second figure of merit, and the defect detector uses at least one threshold-adjusted figure of merit to detect the defect.

8. The system of claim 7, wherein the detected defect is extended or shortened from a threshold decision.

9. The system of claim 7, wherein the threshold determining unit determines upper and lower thresholds for the comparison to establish a threshold range.

10. The system of claim 7, wherein the at least one threshold is a scaling factor that is applied to the at least one of the first figure of merit and the second figure of merit.

11. A method for detecting defects in data, comprising:
obtaining a data signal from a data signal source;
decoding the obtained data signal to produce a decoded data signal;
receiving the data signal and the decoded data signal correlated with respect to a timing reference;
comparing time-referenced information associated with the data signal and the decoded data signal to detect a defect; and
providing an indication of the detected defect.

12. The method of claim 11, further comprising:
combining characteristics of the data signal and the decoded data signal to provide a first information signal; and
manipulating characteristics of the decoded data signal to provide a second information signal,
wherein the comparing compares the first information signal and the second information signal to detect the defect.

13. The method of claim 12, wherein:
the combining comprises multiplying an amplitude of the data signal with an amplitude of the decoded signal according to the timing reference to provide the first information signal, and
the manipulating comprises multiplying an amplitude of the decoded data signal with itself to produce a square of the amplitude of the decoded data signal according to the timing reference to provide the second information signal.

14. The method of claim 12, further comprising:
deriving a first figure of merit for the first information signal by evaluating one or more time-referenced samples of the first information signal; and
deriving a second figure of merit for the second information signal by evaluating one or more time-referenced samples of the second information signal,
wherein the comparing compares the first figure of merit and the second figure of merit to detect the defect.

15. The method of claim 14, wherein deriving the first and second figures of merit comprises performing time-sampled filtering the respective first and second information signals according to the timing reference to derive the first and second figures of merit.

16. The method of claim 15, wherein the time-sampled filtering of each of the respective first and second information signals occurs over at least P bits in length, where P is a positive integer value, and the filtering occurs over a number of time samples P.

17. The method of claim 14, further comprising applying at least one threshold value to at least one of the first figure of merit and the second figure of merit,
wherein the detecting the defect is based on at least one threshold-adjusted figure of merit.

18. The method of claim 17, further comprising at least one of extending and shortening the detected defect from a threshold decision.

19. The method of claim 18, the applying the at least one threshold value comprises applying upper and lower thresholds to establish a threshold range,
wherein detecting the defect is based on the established threshold range.

20. The method of claim 17, wherein the at least one threshold value is a scaling factor that is applied to the at least one of the first figure of merit and the second figure of merit.

* * * * *